Patented Aug. 16, 1938

2,126,831

UNITED STATES PATENT OFFICE 2,126,831

METHOD OF TREATING LATEX AND PRODUCT THEREOF

David Spence, Monterey, Calif.

No Drawing. Application January 7, 1936,
Serial No. 57,966

8 Claims. (Cl. 18—50)

This invention relates to a process for treating latices, especially natural latices of rubber producing plants, and to the product of the process, and has for its principal objects the treatment of latex to overcome its natural tendency to decomposition and coagulation on standing or heating, and to effect the production of a stable and uniform latex which may be used as such in any of the well known applications and processes in which latex is now used, or which may be coagulated and the coagulum treated according to established practices to produce crude rubber of superior qualities and exceptional uniformity. While the invention is particularly valuable for treating fresh latex and therefore will find its widest use on the rubber plantations, it will be apparent that the invention is by no means limited to such use and that the principles hereinafter set forth are capable of numerous other applications with respect to analogous dispersions of rubber and similar materials.

The tendency of latex to coagulate spontaneously on standing or on heating is well known. In the collection of latex and the subsequent storage and utilization of latex, the problem of its natural tendency to coagulate has remained a paramount difficulty to be overcome in its commercial development all along the line. Means have been applied to reduce this tendency of latex to coagulate, such as the addition of ammonia or other common alkali, sodium sulphite, borax and such like in large amounts. It is safe to say that the entire supply of latex available for commercial use today will be found to contain one or other of these reagents, in amount up to one percent. This natural tendency of latex to coagulate on standing or on heating has been the subject of much investigation, discussion, and controversy. It is now generally admitted that the natural enzymes of the latex, aided by bacterial contamination of latex assist in its coagulation by bringing about a decomposition of the latex with a resulting and gradually increasing acidity therein. The common practice has therefore developed of adding from time to time excess amounts of these alkaline reagents to latex in order to maintain an alkaline condition therein, and thus to lessen its tendency to coagulate on keeping. The addition of such alkaline agents to latex has not, however, in any way eliminated the tendency of latex to decomposition but has merely inhibited the normally resultant coagulation, and the presence of such reagents is uneconomical and for many purposes deleterious.

As the result of microbiological studies on latex in which I have been engaged, I have discovered that it is possible to permanently eliminate the tendency of fresh latex to decompose and coagulate on standing or on heating without the addition of these undesirable chemicals, and to preserve latex in its natural state indefinitely without coagulation taking place. As a result it is also possible to prepare rubber from such latex which is exceptionally uniform in physical quality and vulcanization characteristics regardless of the age of the latex.

My investigations have shown that, when fresh latex is allowed to stand, profound changes take place in the same as the result of bacterial and enzymatic decomposition of the various constituents of the latex and even of the rubber itself. As the result of these decompositions, changes occur in the rubber, and the stability of the latex is lessened until spontaneous coagulation finally sets in. Even ammonia-preserved latex when freed from ammonia, quickly becomes foul and coagulates. No means have heretofore been suggested or applied, as far as I am aware, to overcome these objectionable changes which develop in latex on standing, and result not only in the coagulation of latex, but in the production of rubber products of varying quality depending on the extent and nature of the decompositions effected before the latex is coagulated.

My investigations in this field have shown that this tendency of latex to coagulate is greatly reduced by the addition of a suitable buffer solution to the latex, and the latex so buffered can be readily sterilized as by suitable heat treatment without decomposition or coagulation taking place, and when so buffered and sterilized, can be kept indefinitely while still in a sterile condition, without tendency to decomposition or coagulation. The preparation of a sterile latex in its natural condition has not heretofore been described, as far as I am aware. The buffer solution which I have found to be most advantageous in the preparation of a sterile latex is one having substantially the same pH as that of the fresh latex itself. The pH of fresh latex collected from different varieties of rubber producing plants is known to vary considerably and the pH of latex collected from differently located trees of the same variety such as the most common *Hevea brasiliensis* differs somewhat but such variations in the pH of latex collected from a single species of tree are slight, and in the case of Hevea latex ordinarily do not extend beyond the range of substantial neutrality, i. e. a pH of approximately 7.0. Accordingly, a neutral buffer solution with a pH of approximately 7.0 is satisfactory for Hevea latex and it is of course a comparatively simple matter to determine the pH of the buffer solution required for any other latex. A buffer solution of the required pH is readily prepared in a number of ways. I have used for the stabilization and sterilization of Hevea latex, for example, a neutral buffer solution consisting of $$\frac{M}{20}$$

monobasic potassium phosphate ($KH_2PO_4$) and containing the requisite amount of $$\frac{M}{20}$$

sodium hydroxide (NaOH) to bring the pH of the final buffer solution to approximately 7.0, by determination. I have also found that even more dilute buffer solutions of neutral character may be used without coagulation of Hevea latex taking place during sterilization. For example, I have successfully employed an $$\frac{M}{100}$$

buffer solution for the purification and sterilization of ammonia-preserved Hevea latex without coagulation occurring.

The pH of the buffered latex before and after sterilization should be the same as that of the original buffer solution and substantially that of the latex in its natural state. It is, therefore, only necessary to add to Hevea latex, neutral buffer solution sufficient to maintain the pH of the natural latex unchanged during storage and/or treatment. This may be readily accomplished by suitably regulating the concentration or the amount of the neutral buffer solution added to Hevea latex if the latter cannot be promptly sterilized for any reason. 250 c. c. of the buffer solution first mentioned in the preceding paragraph added to each 1,000 c. c. of fresh Hevea latex ordinarily will be sufficient. After sterilization, latex can be kept indefinitely in closed sterile containers without coagulation taking place.

Sterilization of the latex herein referred to can be carried out by the method in bacteriological practice of heating to temperatures above 100° C. by means of steam under pressure. Long continued heating of the latex is to be avoided, and for this reason we recommend heating the latex for 20 minutes by means of steam at 13 lbs. pressure (120° C.).

This invention is of value not only in the gathering of latex and the transport, storage, dilution and treatment of same for the various uses to which this material as such may be applied, but is also applicable to the preparation of rubber of more uniform quality from natural latex by overcoming the undesirable variations in quality brought about by the uncontrolled decompositions which now occur in unsterilized latex on standing or in process. The preservation of fresh latex in its natural state is for many purposes desirable and eliminates the additional expense involved where ammonia or such like has to be removed or neutralized before use or coagulation of the latex.

While I have set forth specific means for accomplishing the purpose of this invention, I do not want to delimit same to any particular buffer solution or amount thereof or to the method of application of same, all of which can be readily modified by anyone skilled in these arts to meet specific requirements in actual practice, without departing from the spirit and purpose of this invention. For example, the buffer reagents may be added to the latex in any desired form, or the latex may be concentrated by the well known means prior to, or after, addition of the buffer solution or the buffer reagents may be added to the serum of wholly, or partially, concentrated latex. Similarly this invention will apply to the sterilization of artificial latex and natural latex to which other materials may be added for any given purposes. All such analogous aqueous dispersions of rubber, gutta percha, balata, and similar gums and resins are included in the generic term "latex" unless otherwise indicated.

I claim:

1. The method of treating latex which comprises adding to the latex a buffer solution having a pH of approximately 7.0 and sterilizing the buffered latex by heat treatment.

2. The method of treating fresh latex which comprises adding to the latex a buffer solution having substantially the same pH as that of the fresh latex, and sterilizing the buffered latex by heat treatment.

3. The method of treating fresh Hevea latex which comprises adding to the latex a buffer solution having a pH of substantially 7.0, and sterilizing the buffered latex by heat treatment.

4. The method of treating Hevea latex which comprises maintaining a pH of the latex at approximately 7.0 for an appreciable period of time by adding a suitable buffer solution and sterilizing the latex by heat treatment during such period.

5. As a new product of manufacture, stable, sterilized latex containing a buffer solution maintaining its pH unchanged at approximately the same value as that of fresh latex of the same variety.

6. As a new product of manufacture, stable, sterilized Hevea latex containing a buffer solution maintaining its pH unchanged at approximately 7.0.

7. As a new product of manufacture, stable, sterilized latex containing a buffer solution maintaining its pH unchanged at approximately 7.0.

8. As a new product of manufacture, a concentrated stable, sterilized latex containing a buffer solution maintaining its pH unchanged at approximately the same value as that of fresh latex of the same variety.

DAVID SPENCE.